Figure 1:
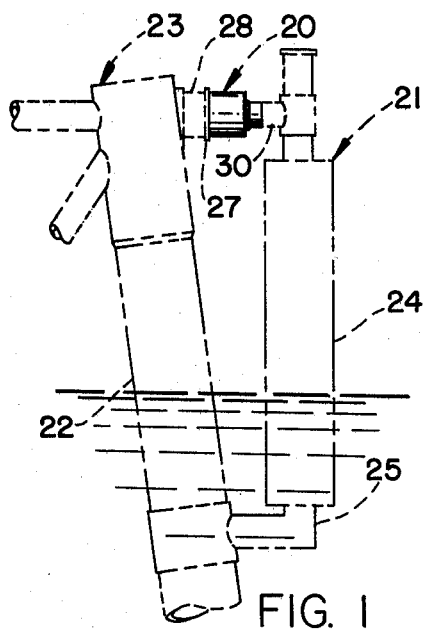

United States Patent [19]

Landers et al.

[11] 4,084,801

[45] Apr. 18, 1978

[54] SHOCK ENERGY ABSORBING MULTI-SEGMENT LOAD CELL

[75] Inventors: Don B. Landers; Robert K. Brock, both of Arlington, Tex.

[73] Assignee: Oil States Rubber Company, Arlington, Tex.

[21] Appl. No.: 636,159

[22] Filed: Nov. 28, 1975

[51] Int. Cl.² .................... F16F 7/12; B63B 59/02; E02B 3/22
[52] U.S. Cl. .................... 267/140; 61/48; 114/219
[58] Field of Search ............... 267/140, 139, 152, 153, 267/57.1 A, 63 A, 63 R; 114/219; 61/48, 46; 213/43; 293/71 R, 85, 86, 88, 98; 248/22 RV

[56] References Cited

U.S. PATENT DOCUMENTS

| | | |
|---|---|---|
| 2,322,844 | 7/1943 | Goldschmidt .................... 267/63 A |
| 2,655,005 | 10/1953 | Kinneman .................... 61/48 |
| 3,464,214 | 9/1969 | King .................... 61/48 |
| 3,564,858 | 2/1971 | Pogonowski .................... 61/48 |
| 3,798,916 | 3/1974 | Schwemmer .................... 267/140 |
| 3,864,922 | 2/1975 | Dial et al. .................... 213/43 |
| 3,876,244 | 4/1975 | Haberle et al. .................... 267/140 |
| 3,933,111 | 1/1976 | Von Bose et al. .................... 114/219 |
| 3,991,582 | 11/1976 | Waldrop et al. .................... 61/48 |
| 3,995,437 | 12/1976 | Drewett .................... 61/48 |
| 4,005,672 | 2/1977 | Files .................... 61/48 |

FOREIGN PATENT DOCUMENTS 504,598   4/1939   United Kingdom .................... 267/63

Primary Examiner—James B. Marbert
Attorney, Agent, or Firm—Warren H. Kintzinger

[57] ABSTRACT

A shock load absorbing load cell with relatively longitudinally movable structural members interconnected by a plurality of shear load elastomeric segments, each having spaced plates bonded to opposite surfaces of an intervening flexible molded block of elastomeric material. Molded shape memory of the elastomeric material blocks resiliently urges the spaced plates back to their original position after they have been displaced in absorbing a shock load.

16 Claims, 13 Drawing Figures

U.S. Patent  April 18, 1978  Sheet 1 of 3  4,084,801

SHOCK ENERGY ABSORBING MULTI-SEGMENT LOAD CELL

This invention relates in general to shock absorbing devices, and in particular to improved shock load absorbing load cells employing shear load-absorbing segments, each having a molded block of elastomeric material with spaced plates bonded to opposite surfaces, interconnecting relatively movable members of a shock cell.

Shock absorbing bumpers and/or shock cells are usually positioned on one or more jacket legs of offshore drilling and production platforms to protect both the platform and the floating vessels approaching the structure for on and off loading. Shock cells cushion the impact of boats hitting against fendering devices. Without shock cells or equivalent structure, the full shock load of a bobbing boat hitting fendering devices would be transferred into the structure and, with repeated blows, weaken it. Generally, a ship approaching a dock, berth, or offshore platform, always has some velocity at the moment of initial contact and the ship is brought to rest by a force acting between the ship's hull—or, between a barge, and the fender face of the dock or platform structure. If the fender face mounting is very rigid and unyielding, the arresting force will be correspondingly high, causing the vessel to be brought to a jarring, sudden stop that can cause damage to the ship and to the motion-arresting structure. Wave movement imparted to a vessel can also cause damage, particularly over a period of time.

Shock cells used to cushion these shock load forces are usually mounted at an upper location on the structure being protected, above the mean water level. Heretofore, such shock cells have been produced, generally, in a one-step molding process wherein the rubber or plastic elastomeric material from which the cell is made is molded-in-place, between two, different-diameter, cylinders that, as a mold-bonded assembly, serves as the absorption unit. With these one-step molded units, the major problem is in the molding. If urathane or rubber is used as the elastomer substance of these pre-existing shock cells, the molded elastomer shrinks. This is true with such molded units, or any other elastomer molded goods, with shrinkage to the mass. The problem is significant—particularly, with elastomeric molded masses of two or more inches thickness—with the breaking-loose of bonds from the cylinders that the molded elastomeric material is otherwise joining. Although this breaking of bonds does not occur every time, with some larger shock cell sizes it occurs at least half the time. Further, while the breaking may not occur during production, the cell may be weakened with residual shrinkage stress that can result in breakage, and failure, six months or even a year later—while in use. When bond breakage occurs before shipping, the elastomer must be burned out in order to use the piping, again, as the piping, itself, is quite expensive. After the shock cells are installed in the field, replacement and repair is expensive not only with respect to the shock cell, itself, but in terms of down time of a docking or platform fender installation, as well.

It is therefore a principal object of the present invention to provide a shock cell structure with elastomeric-mold-block shrinkage/bond-break-failure, minimized, if not completely eliminated.

Another object is to provide a shock cell structure having a plurality of mold-bonded segments wherein single segments may be replaced when they become defective, or fail.

A further object is to provide a shock load selective variation in such a multi-segment load cell, through alternating segment units for different load characteristics, to attain a predetermined loading programed shock cell.

Still a further object is to provide, at reasonable cost, highly efficient shock cells having long service life, with minimal maintenance.

Features of this invention useful in accomplisying the above objects, in a shock energy-absorbing, multi-segment load cell, include use of a plurality of shear load displacement-absorbing elastomeric segments, each with a pair of spaced plates bonded to two opposite bond faces of an intervening flexible molded block of elastomeric material. Thus, the rubber or plastic elastomeric material, molded-material-shrinkage takes place in the individual molded block segments before a plurality of segments are assembled together into a multi-segment load cell.

A specific embodiment representing what is presently regarded as the best mode of carrying out the invention is illustrated in the accompanying drawings.

Figure 2:
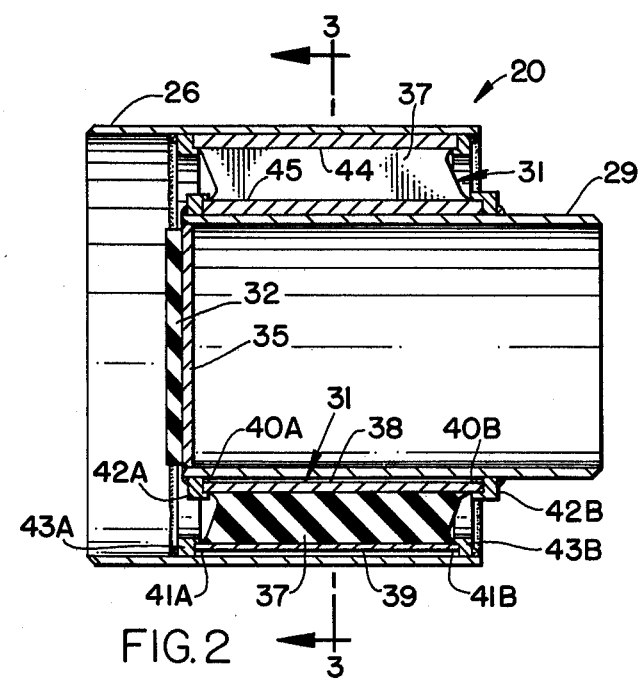
Figures 3, 4:
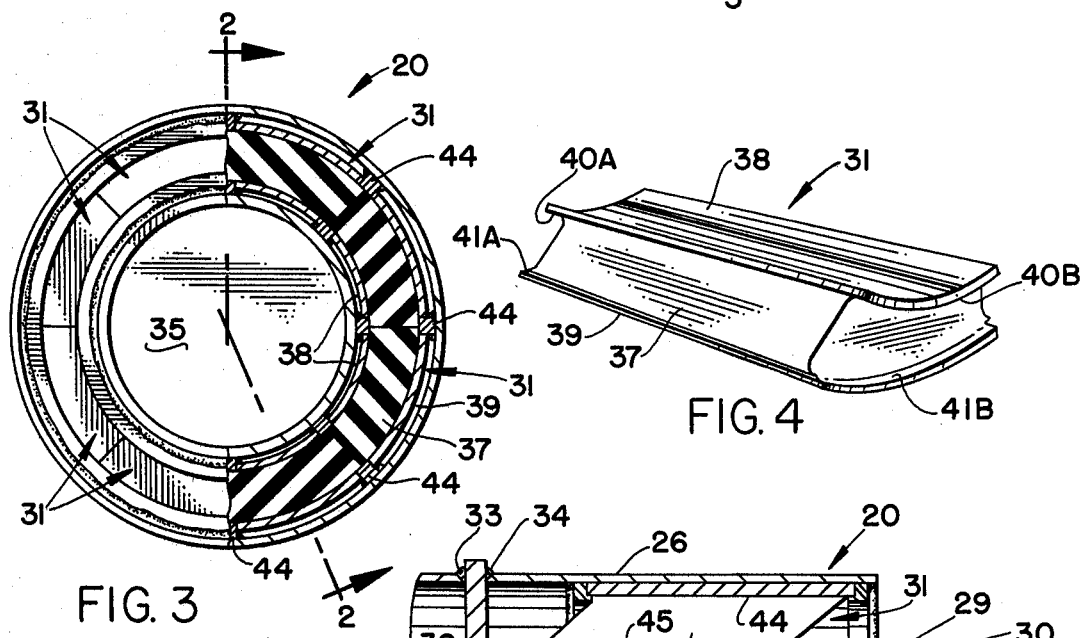
Figure 5:
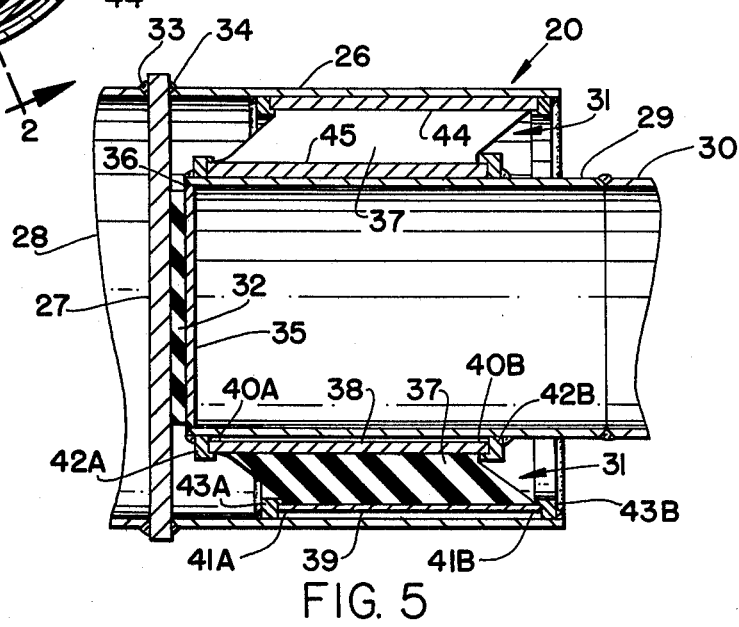
Figure 6:
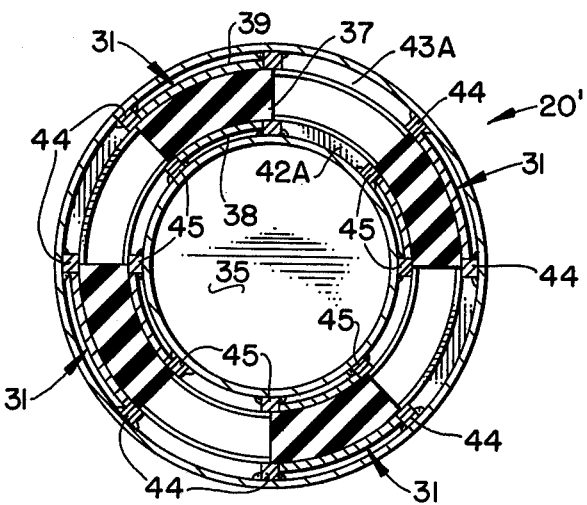
Figure 7:
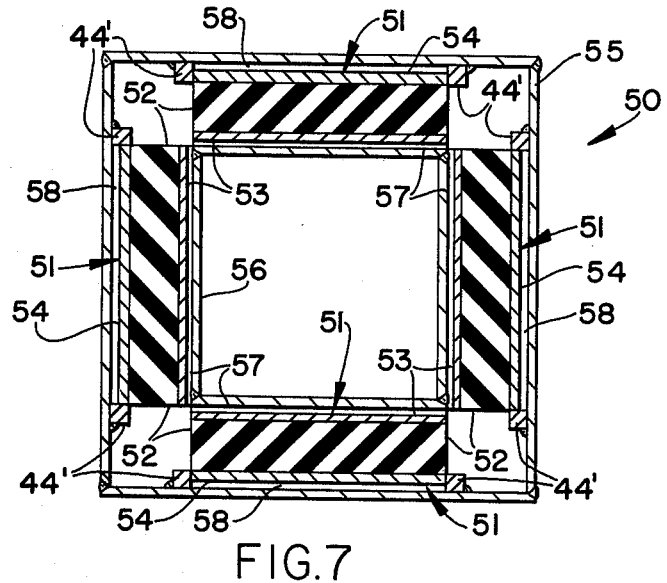
Figure 8:
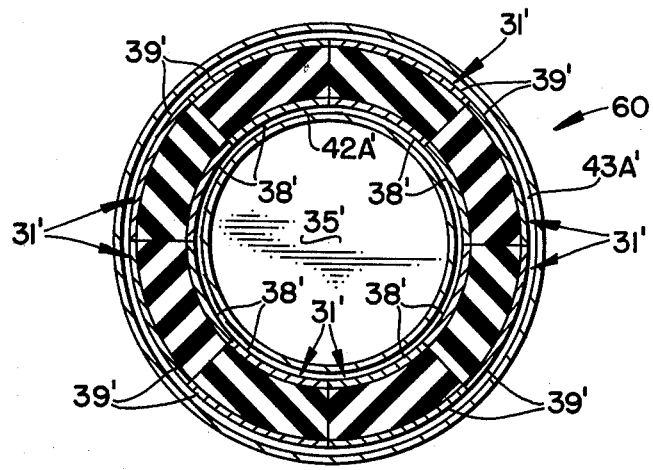
Figure 9:
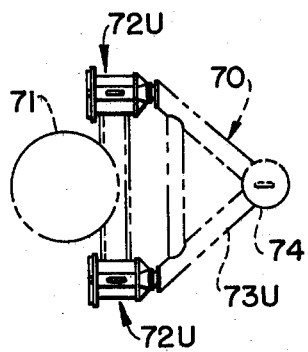
Figure 11:
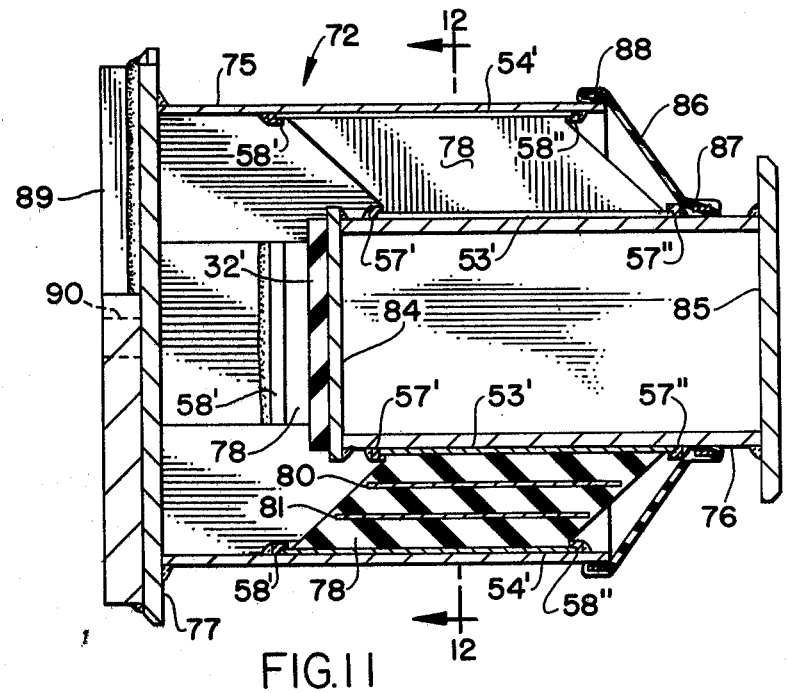
Figure 10:
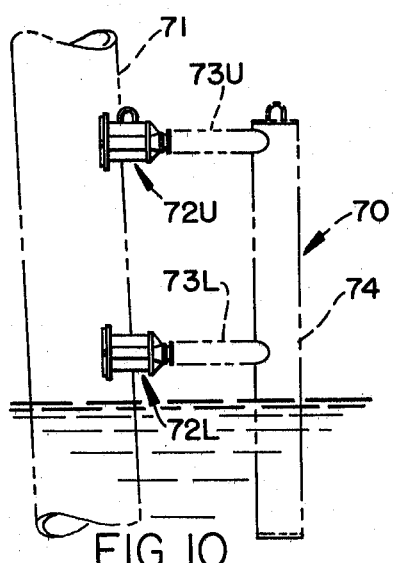
Figure 12:
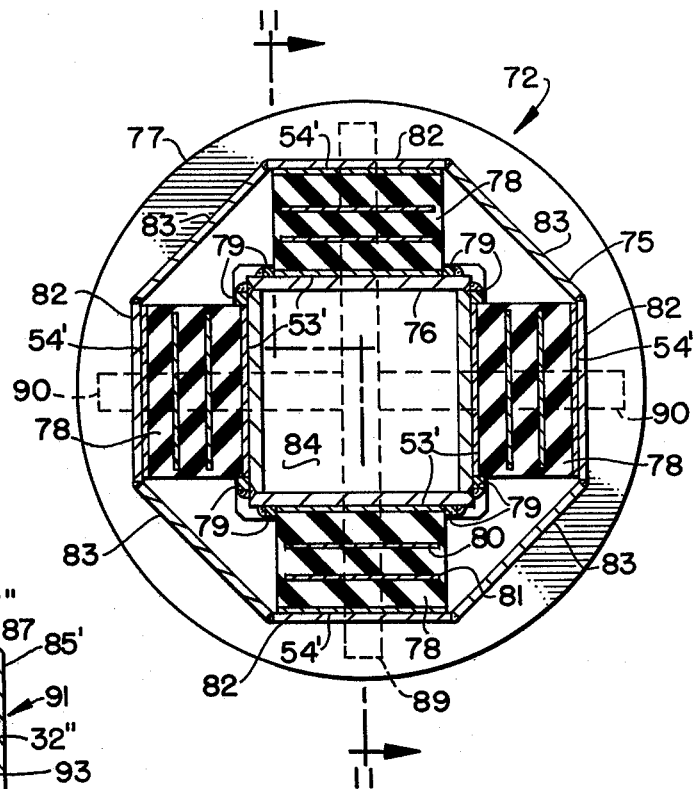
Figure 13:
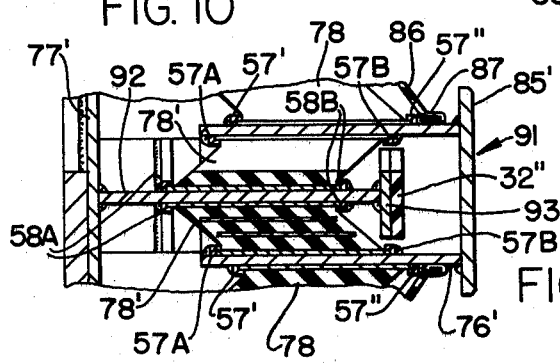

In the drawings:

FIG. 1 represents a partial side elevation view of an offshore platform leg, in phantom, with a shock cell shown as used with a single-cell fendering system;

FIG. 2, a cut-away and sectioned side elevation view of a shock cell, taken along line 2—2 of FIG. 3;

FIG. 3, a half end view, and a half-sectioned transverse view of a shock cell, taken along line 3—3 of FIG. 2;

FIG. 4, a perspective view of a load cell segment such as used in the shock cell of FIGS. 2 and 3, with a pair of spaced plates mold-bonded to opposite faces of an intervening, flexible molded block of elastomeric material;

FIG. 5, a cut-away and sectioned side elevation view of a shock load cell, like FIG. 2, with, however, the load cell in the fully displaced shock loaded state;

FIG. 6, a transverse full-sectioned view, similar to the half-sectioned portion of FIG. 3, with, however, only half as many load cell segments positioned in a cell;

FIG. 7, a transverse full-sectioned view of a rectangular, in transverse section, load cell embodiment;

FIG. 8, a transverse full-sectioned view of an embodiment, similar to that of FIGS. 2 through 5, but with longitudinal segment guide members eliminated;

FIG. 9, a top plan view of a platform leg equipped with a fendering system using a plurality of shock cells;

FIG. 10, a partial side-elevation view of the platform leg of FIG. 9, showing the fendering system to have upper and lower sets of shock cells;

FIG. 11, a cut-away and sectioned view of a shock cell used in the structure of FIGS. 9 and 10, taken along line 11 of FIG. 12;

FIG. 12, a transverse full-sectioned view of the shock cell of FIG. 11; and,

FIG. 13, a sectioned view of a variation from FIG. 11.

A shock cell 20 is shown in FIG. 1 to be installed in a fendering system 21 mounted on a platform leg 22 of an offshore platform 23. This is with the shock cell 20 included at the top of fendering system 21 as an interconnect between the platform leg 22 and the top of bumper assembly 24 that extends down through the mean water level (M.W.L.) to a bottom mount connective structure 25, fastened to the platform leg 22 below the mean water level. The shock cell 20 has an outer cylinder 26 welded in place on shock cell travel limit stop plate 27, that is the outer end member of a shock cell 20 mounting stub extension 28 from leg 22. A smaller-diameter cylinder 29 of the shock cell 20 that is longitudinally movable, in the inward direction relative to outer cylinder 26, is butt-welded to connective tube extension 30 mounted on the top of the bumper assembly 24, in order to take up and absorb vessel shock impact limited travel deflections of the bumper assembly 24. A typical shock cell 20 would, for example, have eight inches of travel and withstand 200,000 pounds force, as the end of eight inches of travel was approached. Thus considerable impact energy may be absorbed by only one shock cell 20.

Referring also to FIGS. 2 and 3, the two different-diameter cylinders, or pipes, (smaller-diameter pipe 29 and larger-diameter pipe 26), are interconnected by load cell segments 31 that permit limited longitudinal telescoping movement of the pipes 26 and 29. The telescoping movement carries the inner pipe 29 through a travel range from the non-loaded state of FIG. 2, to the fully-telescoped, shock-loaded state of FIG. 5, with travel-end bumper pad 32—a cushion pad of rubber or neoprene—in engagement with travel-end limit plate 27. Plate 27, fastened on a shock mounting pipe extension 28, on leg 22, by welding 33, seals the outer end of pipe extension 28, and is fastened to larger-diameter pipe 26 by welding 34. Travel-end bumper pad 32 is bonded to a metal plate 35 that is fastened in place as an end plate on the inner end of smaller-diameter pipe 29, by welding 36.

A plurality of load cell segments 31, like the segment shown in FIG. 4, are formed of molded blocks 37, of elastomeric material such as rubber or neoprene, each bonded to an inner arcuate plate 38 and to an outer arcuate plate 39. Plates 38 and 39, respectively, have lip ends 40A and 40B, and 41A and 41B, extending longitudinally beyond opposite ends of the molded blocks 37. The lip ends 40A and 40B, and 41A and 41B, are retained within L-shaped annular retainer rings 42A and 42B, and 43A and 43B, respectively, fixed by weldments on inner pipe 29 and outer pipe 26. Longitudinally-extended guide bars 44 and 45 are welded to pipes 26 and 29, respectively, as guides for and separators between, adjacent segments 31; particularly, between side-by-side segment plates 38 and 39. It is of interest to note that the molded elastomeric material block 37 of segments 31 is molded to extend outwardly beyond the edge of segment plates 38 and 39, and partially over the tops of respective guide bars 44 and 45, so that side-by-side segments 31 substantially fill the space, in transverse cross section, between pipes 26 and 29. It should be noted that guide bars 44 and 45 are particularly useful in a shock cell 20', such as shown in FIG. 6, wherein some segments 31 have been removed to provide a lower shock load capacity shock cell, to maintain desired segment 31 positioning and longitudinal alignment.

With the rectangular, in transverse cross-section, load cell 50 embodiment of FIG. 7, the load cell segments 51 are rectangular in transverse section, with rectangular molded blocks 52 and flat inner plates 53 anf flat outer plates 54. Load cell 50 includes an outer rectangular housing 55 within which a smaller rectangular member 56 is longitudinally movable through a range of shock load absorbing movement, just as with the embodiment of FIGS. 1 through 5, wherein many parts have their counterparts (some not shown in detail for the embodiment of FIG. 7). Longitudinally extended guide bars 44' maintain proper alignment of respective segment plates 54, and, thereby, the load cell segments 51. The load cell 50 also includes L-shaped bars, fulfilling a function like that provided by retainer rings 42A, 42B, 43A, and 43B, in the embodiment of FIGS. 2 through 5, such as bars 57 and 58 (only partially seen in FIG. 7).

With respect to the shock load cell 60 embodiment of FIG. 8 (shown in transverse cross-section, only, and with various parts employing primed designation numbers, since they are generally quite similar to corresponding parts of the embodiment of FIGS. 2 through 7), longitudinally-extended guide bars are not used. Thus, a full set of load cell segments 31' must always be used in a shock load cell 60, to maintain segment position and alignment through mutual side-by-side segment 31' engagement. With this approach there is no molded block 37' elastomeric material overlap beyond the edges of segment plates 38' and 39'.

A four-shock load cell fendering system 70 is shown in FIGS. 9 and 10, for protecting platform leg 71, with a pair of load cells 72U mounted in an upper A-frame structure 73U, on leg 71, and a pair of load cells 72L mounted in a lower A-frame structure 73L, above the mean water level. The two A-frame structures 73U and 73L mount a bumper element 74 that extends from mounting connections with the A-frame structures, down through the mean water level. The shock load cell structure 72, used in fendering system 70, is shown in FIGS. 11 and 12 to have an outer octagon housing 75 mounted in place on leg 71, within which smaller rectangular member 76 is longitudinally movable through a range of shock load absorbing movement, just as with the embodiment of FIGS. 1 through 5, from the pre-load state of FIG. 11, to the fully-telescoped shock-loaded state, with travel end rubber bumper pad 32' in engagement with travel-end limit plate 77.

Four load cell segments 78 are used in each load cell structure 72, one on each of the four sides of member 76, actually a square member in transverse section. Longitudinally extended guide bars 79 are welded in place on member 76 as opposite side guides for the inner plate 53' of respective segments 78, also equipped with outer plates 54', all molded together as individual segment units. The individual segments 78 also include mold-imbedded stabilizing plates 80 and 81 that help maintain the structural integrity of the molded block segments throughout the entire range of shear load distortion travel imposed on the molded elastomeric material that in this instance is in the form of compression-molded segments. It is of interest to note that outer guide bars are not required in this embodiment because the octagon sides 82, opposite and parallel to the respective four sides of members 76, match the width of outer plates 54', with the adjacent sloped sides 83 of the octagon housing 75 acting as guides for the segment outer plates 54'. Plate 84, on the inner end of member 76, mounts rubber bumper pad 32', and the outer end of member 76 is closed by shock force thrust plate 85, welded in place thereon. A flexible material protective boot 86 closes the outer end of octagon-sided housing 75, with a sheath of flexible material extended between a four-sided seal bead end 87, in sealing engagement with the four sides of member 76, and an eight-sided seal bead end 88, in sealing engagement with the outer rim end of the eight-sided octagon housing 75. Reinforcing bars 89 and 90 are welded to the outer face of travel-end limit plate 77 to stiffen and strengthen the plate 77 in absorbing internal shock blows from pad 32'. Within the load cell, L-shaped bars 57', 57", 58', and 58", fulfull a function like that provided by retainer rings 42A, 42B, 43A, and 43B, in the embodiment of FIGS. 2 - 5.

The load cell 91 embodiment of FIG. 13 is a modification of the FIGS. 11 and 12 embodiment 72, with two additional load cell segments 78' mounted within the smaller rectangular member 76'. To facilitate such modification, a flat plate 92 is weldment-mounted to the inner face of plate 77' to project forwardly to within most of the length of rectangular member 76', and support a rubber bumper pad 32", mounting plate 93 at a proper travel limit position for engagement of the inside surface of shock force thrust plate 85' against pad 32", at the shock load travel end. The flat plate 92 (seen as a part, in a side-elevation, sectioned, view in FIG. 13), extends in width through at least the width of load cell segments 78'—that may be the same size as load cell segments 78, or of a different size, as a design convenience—and mounts L-shaped bars 58A and 58B that, along with L-shaped bars 57A and 57B, fulfill a function such as bars 57', 57", 58' and 58", fulfill.

Thus, there is hereby provided a shock energy-absorbing, multi-segment load cell, with the segments made of elastomeric material absorbing shear forces through a limited range of shear distortion travel that then act, collectively, as a restoring spring in the load cell. The segments with blocks of elastomeric material between inner and outer plates are mold-bonded together as segment units, separately, before assembly in a load cell, with elastomeric material shrinkage occurring before the units are assembled. Many of the segments are compression-molded, and some include metal plate inserts within the molded elastomeric material of a segment, as a structural stabilizer to a segment, through its operational range of shear distortion.

Whereas, this invention is herein illustrated and described with respect to several embodiments hereof, it should be realized that various changes may be made without departing from essential contributions to the art made by the teachings hereof.

We claim:

1. In an energy absorbing load cell: first and second relatively movable telescoping members; with said first telescoping member being larger than, and enclosing, a substantial portion of said second telescoping member; said second telescoping member being of smaller size through the longitudinal portion thereof telescoped within said first telescoping member with spacing between said first and second telescoping members; said structural means being comprised exclusively of shear load travel distortable load absorbing segments having a block of elastomeric flexible material with first and second spaced surfaces thereof bonded respectively to an individually associated pair of first and second plates of relatively rigid material and with respective ones of each said associated pair of plates being individually rigidly affixed to each of said first and second telescoping members; and said structural means including at least a first plurality of longitudinally extending shear load travel distortable load-absorbing segments symmetrically positioned with mutually parallel longitudinal axes in the spacing between said first and second telescoping members and extending substantially over the longitudinal extent of said spacing.

2. The energy absorbing load cell of claim 1, wherein first interconnect means interconnects said first plates of the segments and the first member of said first and second relatively movable telescoping members; and second interconnect means interconnects said second plates of the segments and the second member of said first and second relatively movable telescoping members.

3. The energy absorbing load cell of claim 2, wherein said first and second relatively movable telescoping members are constrained primarily to one direction of back and forth relative movement; said first and said second plates of said first plurality of segments are longitudinally extended in the direction of back and forth relative movement beyond ends of the molded blocks of respective ones of those segments; and wherein said interconnect means includes plate and overlap members fastened to said first and second relatively movable telescoping members in position to overlap respective laterally extended plate ends of said first and second plates of said first plurality of segments.

4. The energy absorbing load cell of claim 3 with a plurality of guide bar means mounted on at least one of said first and second relatively movable telescoping members, said guide bar means mounted to longitudinally extend in the direction of back and forth relative movement between said first and second relatively movable telescoping members, and with parallel adjacent ones of said guide bar means confiningly engaging respective opposite longitudinally extending plate sides of predetermined ones of said first and second plates of said segments.

5. The energy absorbing load cell of claim 4, wherein said first and second relatively movable telescoping members are different-diameter pipe sections.

6. The energy absorbing load cell of claim 4, wherein said first and second relatively movable spaced members are a rectangular housing and a smaller cross-section rectangular member.

7. The energy absorbing load cell of claim 4, wherein said first and second relatively movable telescoping members are an eight-sided, octagonal housing, and a smaller, cross-section, rectangular member.

8. The segment structure of claim 1, with mold-embedded plate means within said flexible molded block of elastomeric material.

9. The segment structure of claim 1, with said first plate and said second plate extending beyond opposite ends of said flexible molded block of elastomeric material, in a longitudinal direction.

10. The segment structure of claim 9, with said flexible molded block of elastomeric material of said first plurality of segments extended transversely beyond lateral edges of said first and second plates.

11. The energy absorbing load cell of claim 1, wherein said second telescoping member is hollow; a further plurality of said shear load travel distortional, load-absorbing segment means contained within said second telescoping member; a support member connected to said first telescoping member and extending to within said second telescoping member, and with respective ones of said associated pairs of first and second plates of said further plurality of segment means individually affixed to said second telescoping member and said support member.

12. The energy absorbing load cell of claim 11, wherein shock load travel limit stop means is included in said load cell.

13. The energy absorbing load cell of claim 12, wherein said shock load travel limit stop means includes a first stop member on said second relatively movable telescoping member, and a second stop member connected to said first relatively movable telescoping member.

14. The energy absorbing load cell of claim 13, wherein said shock load travel limit stop means also includes resiliently compressible cushion means mounted on one of said stop members, in position to cushion stop closing movement of said first and second stop members as they are moved into the travel limit stop state.

15. The energy absorbing load cell of claim 11, wherein said support member includes a plate, mounted on a closure member connected to said first relatively movable telescoping member; with said plate projecting to within said second telescoping member; and with said further segment means comprising two shear load travel distortional load-absorbing segment means interconnecting opposite sides of said plate and interior surface means of said hollow second telescoping member.

16. The energy absorbing load cell of claim 15, wherein interior surface means of said hollow second telescoping member includes a plurality of flat surfaces.

* * * * *